(12) United States Patent
Park et al.

(10) Patent No.: US 10,425,267 B2
(45) Date of Patent: Sep. 24, 2019

(54) TECHNIQUES FOR REDUCING ADJACENT CHANNEL LEAKAGE-POWER RATIO

(71) Applicant: QUALCOMM Incorporated, San Diego, CA (US)

(72) Inventors: Seyong Park, San Diego, CA (US); Peter Gaal, San Diego, CA (US); Yi Huang, San Diego, CA (US); Renqiu Wang, San Diego, CA (US); Hao Xu, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/961,489

(22) Filed: Apr. 24, 2018

(65) Prior Publication Data

US 2018/0316531 A1 Nov. 1, 2018

Related U.S. Application Data

(60) Provisional application No. 62/491,174, filed on Apr. 27, 2017.

(51) Int. Cl.
*H04L 25/49* (2006.01)
*H04L 27/26* (2006.01)
(Continued)

(52) U.S. Cl.
CPC .......... *H04L 27/263* (2013.01); *H04B 7/06* (2013.01); *H04J 11/0023* (2013.01);
(Continued)

(58) Field of Classification Search
CPC .. H03H 1/3247; H04L 27/368; H03B 17/354; H03B 2001/1045
(Continued)

(56) References Cited

U.S. PATENT DOCUMENTS

| 2011/0085513 A1* | 4/2011 | Chen | H04W 72/042 370/330 |
|---|---|---|---|
| 2012/0057650 A1* | 3/2012 | Felix | H04B 1/707 375/296 |

(Continued)

FOREIGN PATENT DOCUMENTS

| WO | WO-2016/178606 A1 | 11/2016 |
|---|---|---|
| WO | WO-2017/065825 A1 | 4/2017 |
| WO | WO-2017/110835 A1 | 6/2017 |

OTHER PUBLICATIONS

Qualcomm Incorporated: "Waveform Candidates", 3GPP Draft; R1-162199, 3rd Generation Partnership Project (3GPP), Mobile Competence Centre; 650, Route Des Lucioles; F-06921 Sophia-Antipolis Cedex; France, vol. RAN WG1, No. Susan, Korea; Apr. 2, 2016, XP051080027, Retrieved from the Internet: URL:http://www.3gpp.org/ftp/tsg_ran/WG1_RL1/TSGR1_84b/Docs/ [retrieved on Apr. 2, 2016], 26 pages.

(Continued)

*Primary Examiner* — Khai Tran
(74) *Attorney, Agent, or Firm* — Arent Fox LLP

(57) ABSTRACT

Adjacent channel leakage-power ratio (ACLR) can be reduced at a transmitter of a device. A modulated signal can be mapped into a plurality of tone sets in a frequency domain, wherein the plurality of tone sets include a first, a second, and a third set of tones. The first and the third set of tones can be converted in the frequency domain to a fourth and a fifth set of tones, respectively, in a time domain. A zero padding of one or more symbols associated with the fourth and the fifth set of tones can be performed to output a sixth and a seventh set of tones, respectively. The sixth and the seventh set of tones can be converted to an eighth and a ninth set of tones, respectively, in the frequency domain. The eighth and the ninth set of tones can be processed for transmitting to another wireless device.

30 Claims, 14 Drawing Sheets

(51) Int. Cl.
*H04B 7/06* (2006.01)
*H04J 11/00* (2006.01)
*H04L 25/03* (2006.01)

(52) U.S. Cl.
CPC .... *H04L 25/03821* (2013.01); *H04L 27/2605* (2013.01); *H04L 27/2627* (2013.01)

(58) Field of Classification Search
USPC .......................... 375/296, 300; 370/294, 330
See application file for complete search history.

(56) References Cited

U.S. PATENT DOCUMENTS

| | | |
|---|---|---|
| 2013/0016765 A1 | 1/2013 | Park et al. |
| 2016/0006586 A1 | 1/2016 | Berardinelli et al. |
| 2016/0191183 A1* | 6/2016 | Lee ..................... H04B 1/0475 370/294 |
| 2017/0064692 A1 | 3/2017 | Kahtava et al. |

OTHER PUBLICATIONS

International Search Report and Written Opinion—PCT/US2018/029448—ISA/EPO—dated Jul. 24, 2018 15 pages.

* cited by examiner

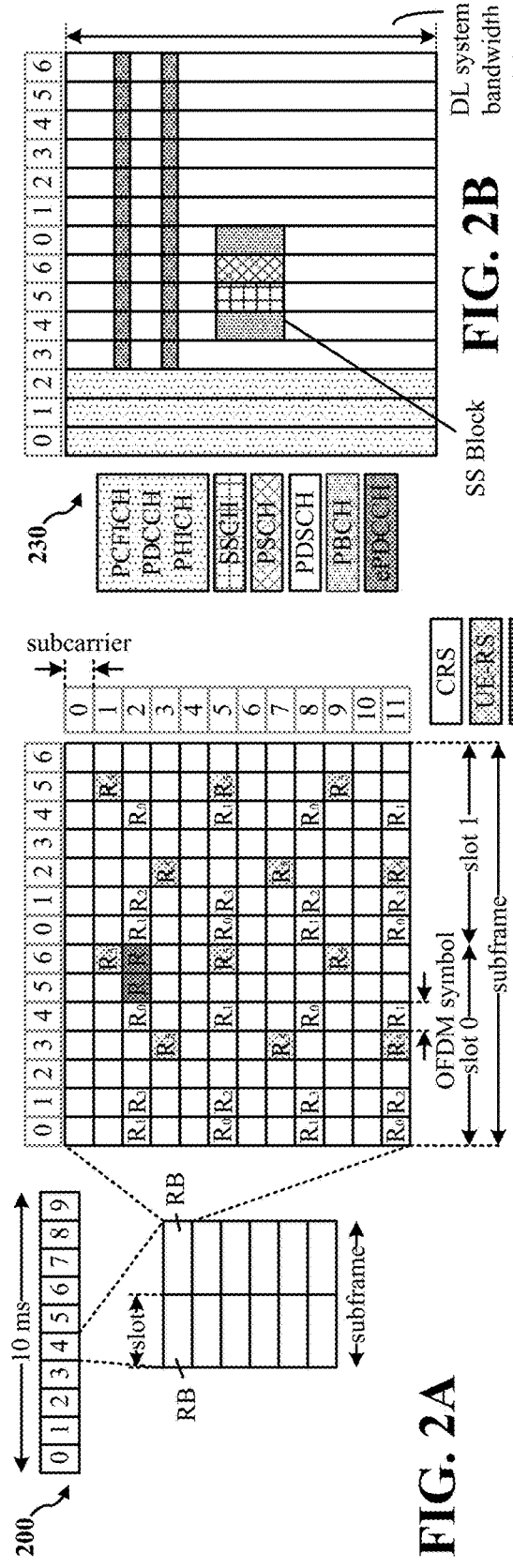
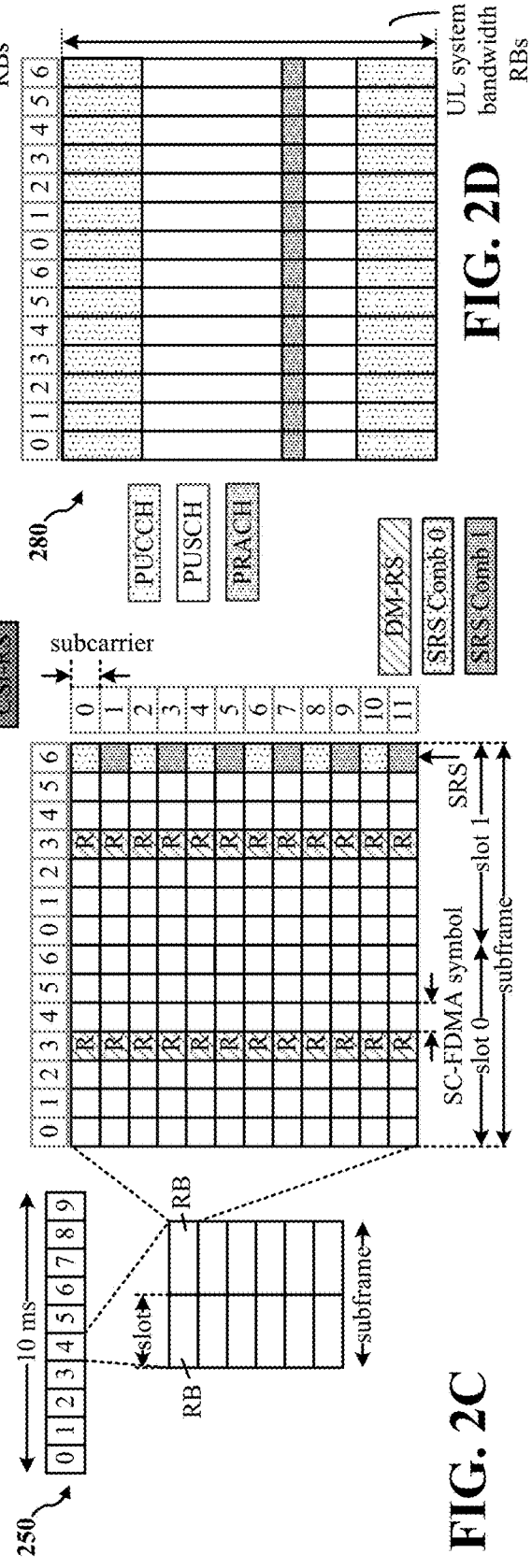
FIG. 2A
FIG. 2B
FIG. 2C
FIG. 2D

TECHNIQUES FOR REDUCING ADJACENT CHANNEL LEAKAGE-POWER RATIO

CLAIM OF PRIORITY UNDER 35 U.S.C. § 119

The present Application for Patent claims priority to Provisional Application No. 62/491,174, entitled "TECHNIQUES FOR REDUCING ADJACENT CHANNEL LEAKAGE-POWER RATIO" filed Apr. 27, 2017, which is assigned to the assignee hereof and hereby expressly incorporated by reference herein for all purposes.

BACKGROUND

Aspects of the present disclosure relate generally to wireless communication networks, and more particularly, to reducing adjacent channel leakage-power ratio (ACLR) at wireless devices.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, in wireless networks, the main source of ACLR is discontinuity or sudden transition between consecutive OFDM symbols which may lead to inter-carrier interference. Thus, there is a need to reduce or minimize the inter-carrier interference associated with the discontinuity or the sudden transition between consecutive OFDM symbols to reduce or minimize the ACLR.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method of reducing adjacent channel leakage-power ratio (ACLR) at a transmitter of a wireless device is provided. The method includes mapping, at the transmitter, a modulated signal into a plurality of tone sets in a frequency domain, wherein the plurality of tone sets include a first, a second, and a third set of tones, converting, at the transmitter, the first and the third set of tones in the frequency domain to a fourth and a fifth set of tones, respectively, in a time domain, performing, at the transmitter, a zero padding of one or more symbols associated with the fourth and the fifth set of tones to output a sixth and a seventh set of tones, respectively, converting, at the transmitter, the sixth and the seventh set of tones to an eighth and a ninth set of tones, respectively, in the frequency domain, and processing the eighth and the ninth set of tones for transmitting to another wireless device.

An apparatus for reducing adjacent channel leakage-power ratio (ACLR) at a transmitter is provided. The apparatus includes a transceiver for communicating one or more wireless signals via at least the transmitter and one or more antennas, a memory configured to store instructions, and one or more processors communicatively coupled with the transceiver and the memory. The one or more processors are configured to map a modulated signal into a plurality of tone sets in a frequency domain, wherein the plurality of tone sets include a first, a second, and a third set of tones, convert the first and the third set of tones in the frequency domain to a fourth and a fifth set of tones, respectively, in a time domain, perform a zero padding of one or more symbols associated with the fourth and the fifth set of tones to output a sixth and a seventh set of tones, respectively, convert the sixth and the seventh set of tones to an eighth and a ninth set of tones, respectively, in the frequency domain, and process the eighth and the ninth set of tones for transmitting to another wireless device.

An apparatus for reducing adjacent channel leakage-power ratio (ACLR) at a transmitter is provided. The apparatus includes means for mapping a modulated signal into a plurality of tone sets in a frequency domain, wherein the plurality of tone sets include a first, a second, and a third set of tones, means for converting the first and the third set of tones in the frequency domain to a fourth and a fifth set of tones, respectively, in a time domain, means for performing a zero padding of one or more symbols associated with the fourth and the fifth set of tones to output a sixth and a seventh set of tones, respectively, means for converting the sixth and the seventh set of tones to an eighth and a ninth set of tones, respectively, in the frequency domain, and means for processing the eighth and the ninth set of tones for transmitting to another wireless device.

A computer-readable medium, including code executable by one or more processors for reducing adjacent channel leakage-power ratio (ACLR) at a transmitter is provided. The code includes code for mapping a modulated signal into a plurality of tone sets in a frequency domain, wherein the plurality of tone sets include a first, a second, and a third set of tones, code for converting the first and the third set of tones in the frequency domain to a fourth and a fifth set of tones, respectively, in a time domain, code for performing a zero padding of one or more symbols associated with the fourth and the fifth set of tones to output a sixth and a seventh set of tones, respectively, code for converting the sixth and the seventh set of tones to an eighth and a ninth set of tones, respectively, in the frequency domain, and code for processing the eighth and the ninth set of tones for transmitting to another wireless device To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2A is a diagram illustrating an example of a downlink (DL) frame structure.

FIG. 2B is a diagram illustrating an example of channels within the DL frame structure.

FIG. 2C is a diagram illustrating an example of an uplink (UL) frame structure.

FIG. 2D is a diagram illustrating an example of channels within the UL frame structure.

DETAILED DESCRIPTION

Figure 1:
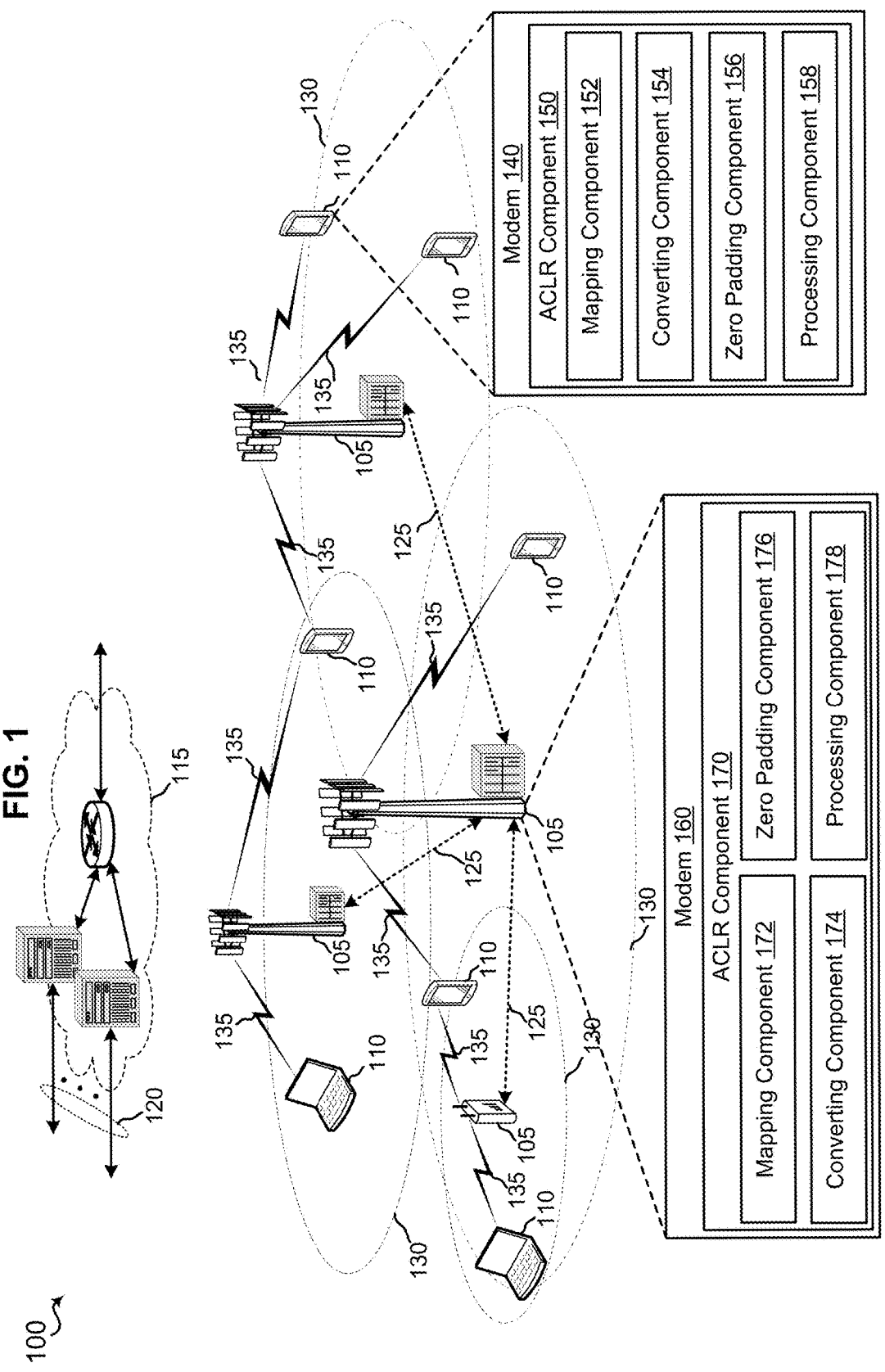
FIG. 1 is a schematic diagram of a wireless communication network including at least one user equipment (UE) having an adjacent channel leakage-power ratio (ACLR) component and/or at least one base station having a corresponding ACLR component, both ACLR components are configured according to this disclosure to reduce ACLR.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to reducing adjacent channel leakage-power ratio (ACLR) at a transmitter of a wireless device. For example, a wireless device may reduce the ACLR at the transmitter of the wireless device by inserting zeroes (or zeroed symbols) at symbol boundaries of a signal. This can include, for example, mapping, at the transmitter, a modulated signal into a plurality of tone sets in a frequency domain, where the plurality of tone sets can include at least a first, a second, and a third set of tones and converting, at the transmitter, at least the first and the third set of tones in the frequency domain to a fourth and a fifth set of tones, respectively, in a time domain. This example can further include performing, at the transmitter, a zero padding of one or more symbols associated with the fourth and the fifth set of tones (e.g., by inserting, appending, etc. zeroed symbols thereto) to output a sixth and a seventh set of tones, respectively, converting, at the transmitter, the sixth and the seventh set of tones to an eighth and a ninth set of tones, respectively, in the frequency domain, and processing the eighth and the ninth set of tones for transmitting to the receiver of the wireless device.

In another example, a wireless device may reduce the ACLR at a receiver of a wireless device by processing the signal having the inserted zeroes (or zeroed symbols) at the symbol boundaries. For example, this may include de-assigning, at the receiver, a channel equalized signal into a plurality of tone sets in a frequency domain, where the plurality of tone sets include at least a first set, a second set, and a third set of tones, and where the first, the second, and the third set of tones can be associated with head tones, center tones, and tail tones, respectively. This example can further include converting, at the receiver, at least the first and the third set of tones in the frequency domain to a fourth and a fifth set of tones, respectively, in a time domain, detecting, at the receiver, a zero padding of symbols associated with the fourth and the fifth set of tones, converting, at the receiver and based on detecting the zero padding, the fourth and the fifth tones to a sixth and a seventh set of tones, respectively, in the frequency domain; and processing of the sixth and the seventh set of tones for decoding data received from a transmitter of the wireless device.

Additional features of the present aspects are described in more detail below with respect to FIGS. 1-14.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having an ACLR component 150 that can manage execution of one or more of a mapping component 152, a converting component 154, a zero padding component 156 and/or a processing component 158. The mapping component 152 is configured to map a modulated signal into a plurality of tone sets in a frequency domain, where the plurality of tone sets can include at least a first, a second, and a third set of tones. The converting component 154 is configured to convert at least the first and the third set of tones in the frequency domain respectively to a fourth and a fifth set of tones in a time domain. The zero padding component 156 is configured to perform a zero padding of one or more symbols associated with the fourth and the fifth set of tones to output respectively a sixth and a seventh set of tones. The converting component 154 is configured to convert the sixth and the seventh set of tones respectively to an eighth and a ninth set of tones in the frequency domain. The processing component 158 is configured to process the eighth and the ninth set of tones, e.g., along with the second set of tones, for transmitting to another wireless device, e.g., eNB 105.

In another aspect, the eNB 105 may include a modem 160 and/or an ACLR component 170. The ACLR component 170 includes a mapping component 172, converting component 174, zero padding component 176 and processing component 178. In an example, The ACLR component 170 or the components of the ACLR component 170 can perform similar functions as described above for ACLR component 150 of the UE 110. In another example, the components of the ACLR component 170 can perform different functionality associated with decoding communications encoded by ACLR component 150. For example, the mapping component 172 can be configured to de-assign a channel equalized signal into a plurality of tone sets in a frequency domain, where the plurality of tone sets include at least a first set, a second set, and a third set of tones, and where the first, the second, and the third set of tones can be associated with head tones, center tones, and tail tones, respectively. The converting component 174 can be configured to convert at least the first and the third set of tones in the frequency domain respectively to a fourth and a fifth set of tones in a time domain. The zero padding component 176 can be configured to detect a zero padding of one or more symbols associated with the fourth and the fifth set of tones. The converting component 174 can be configured to accordingly convert the fourth and fifth set of tones respectively to a sixth and seventh set of tones in the frequency domain. The processing component 178 can be configured to process the sixth and seventh set of tones as the data received from UE 110. In other examples, the UE 110 can employ functions described with respect to ACLR component 170 and the eNB 105 can employ functions described with respect to ACLR component 150 for transmitting communications from the eNB 105 to the UE 110. In other words, the techniques described above may be implemented for transmitting data (or data bits) from the UE 110 to the eNB 105 and/or the eNB 105 to the UE 110 to reduce ACLR at the transmitter of the UE 110 and/or the eNB 105, or the techniques described above may be implemented for receiving data (or data bits) at the UE 110 or the eNB 105 to reduce ACLR at a receiver of the UE 110 and/or the eNB 105.

Thus, according to the present disclosure, the ACLR component 150 and/or ACLR component 170 may facilitate reduction of ACLR in a UE 110, eNB 105, and/or substantially any wireless device(s) that may employ the ACLR component(s) 150, 170 in communicating with one another.

The wireless communication network 100 may include one or more eNBs or base stations 105, one or more UEs 110, and a core network 115. The core network 115 may provide user authentication, access authorization, tracking, internet protocol (IP) connectivity, and other access, routing, or mobility functions. The eNBs 105 may interface with the core network 115 through backhaul links 120 (e.g., S1, etc.). The eNBs 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels.

A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (e.g., for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on resources corresponding to one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
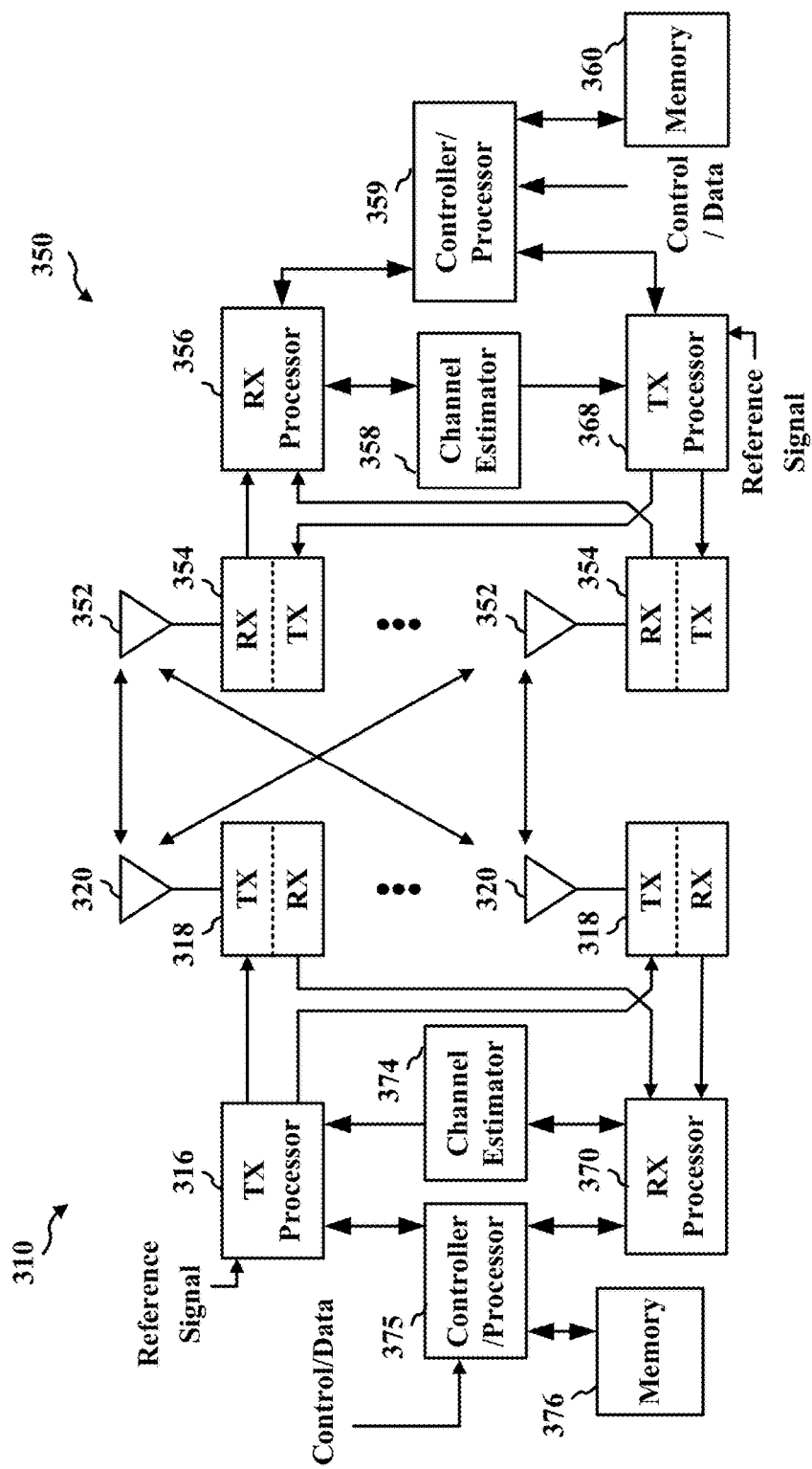
FIG. 3 is an example block diagram of a base station in communication with a UE in an access network.

FIG. 3 is a block diagram of a base station 310 in communication with a UE 350 in an access network. In the DL, IP packets from an evolved packet core (e.g., core network 115) may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from an evolved packet core (e.g., core network 115). The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to an evolved packet core (e.g., core network 115). The controller/processor 375 is also responsible for error detection using an ACK and/or NACK protocol to support HARQ operations.

Figure 4:
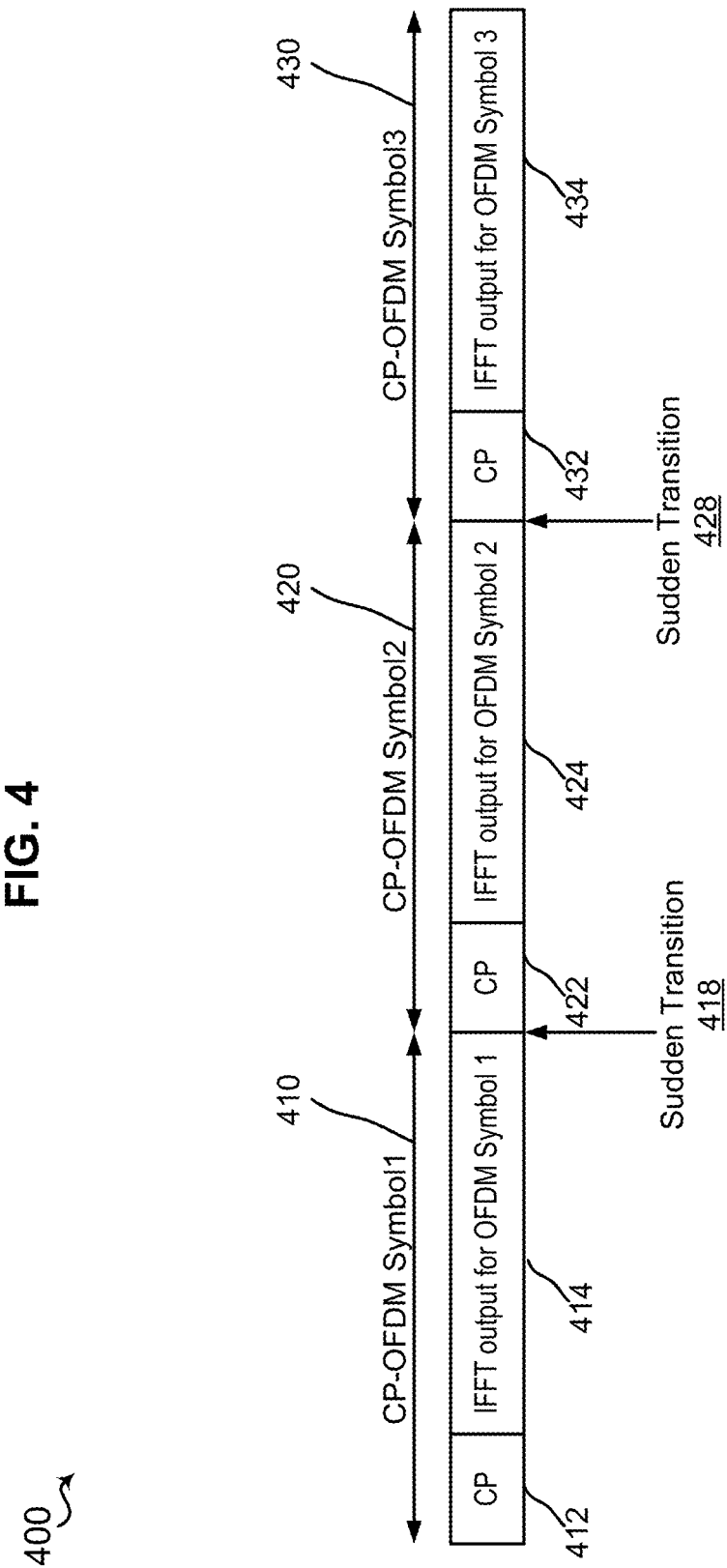
FIG. 4 illustrates an example of a frame structure with three cyclic prefix (CP)-orthogonal frequency division multiplexing (OFDM) symbols.

FIG. 4 illustrates an example of a frame structure 400 with three cyclic prefix (CP)-orthogonal frequency division multiplexing (OFDM) symbols. The example frame structure 400 shows a CP-OFDM symbol1 (410), a CP-OFDM symbol2 (420), and a CP-OFDM3 symbol (430). The CP-OFDM symbols 410, 420, and/or 430 may be similar to OFDM symbols described above in FIG. 2. Each CP-OFDM symbol includes a cyclic-prefix (CP) and an inverse fast Fourier transform (IFFT) output of a corresponding OFDM symbol. That is, the CP-OFDM symbol1 (410) includes a CP 412 and an inverse fast Fourier transform (IFFT) output for OFDM symbol1 (414), the CP-OFDM symbol2 (420) includes a CP 422 and an IFFT output for OFDM symbol2 (424), and the CP-OFDM symbol (430) includes a CP 432 and an IFFT output for OFDM symbol3 (434). A CP may be created by copying time domain samples from a later portion of an OFDM symbol and inserting them at the beginning of the OFDM symbol. An IFFT may generally be used to convert an OFDM symbol in frequency domain to an OFDM symbol in time domain.

As shown in FIG. 4, a sudden transition (e.g., also referred to as a transition that is not smooth) may occur at boundaries of CP-OFDM symbols (also referred to as OFDM symbols in the present disclosure) in time, such that one CP-OFDM symbol can begin substantially immediately after another CP-OFDM symbol in a received frame, and there may be no indication of where the first CP-OFDM symbol ends and the next CP-OFDM symbol begins. For example, a sudden transition 418 may occur at a boundary between the CP-OFDM symbol1 (410) and the CP-OFDM symbol2 (420). A sudden transition 428 may occur at a boundary between the CP-OFDM symbol2 (420) and the CP-OFDM symbol3 (430). That is, a sudden transition may occur due to discontinuity at the boundary of two symbols. In other words, the sudden transition may be due to absence of a relationship between consecutive symbols, etc., CP-OFDM symbol1 (410) and CP-OFDM symbol2 (420), CP-OFDM symbol2 (420) and CP-OFDM symbol3 (430), etc.

The above described sudden transition at the boundaries between OFDM symbols may lead to interference, for example, inter-carrier interference or ACLR. The present disclosure describes systems and techniques for reducing ACLR at a transmitter and/or a receiver of a wireless device, e.g., UE 110 and/or eNB 105.

Figure 5:
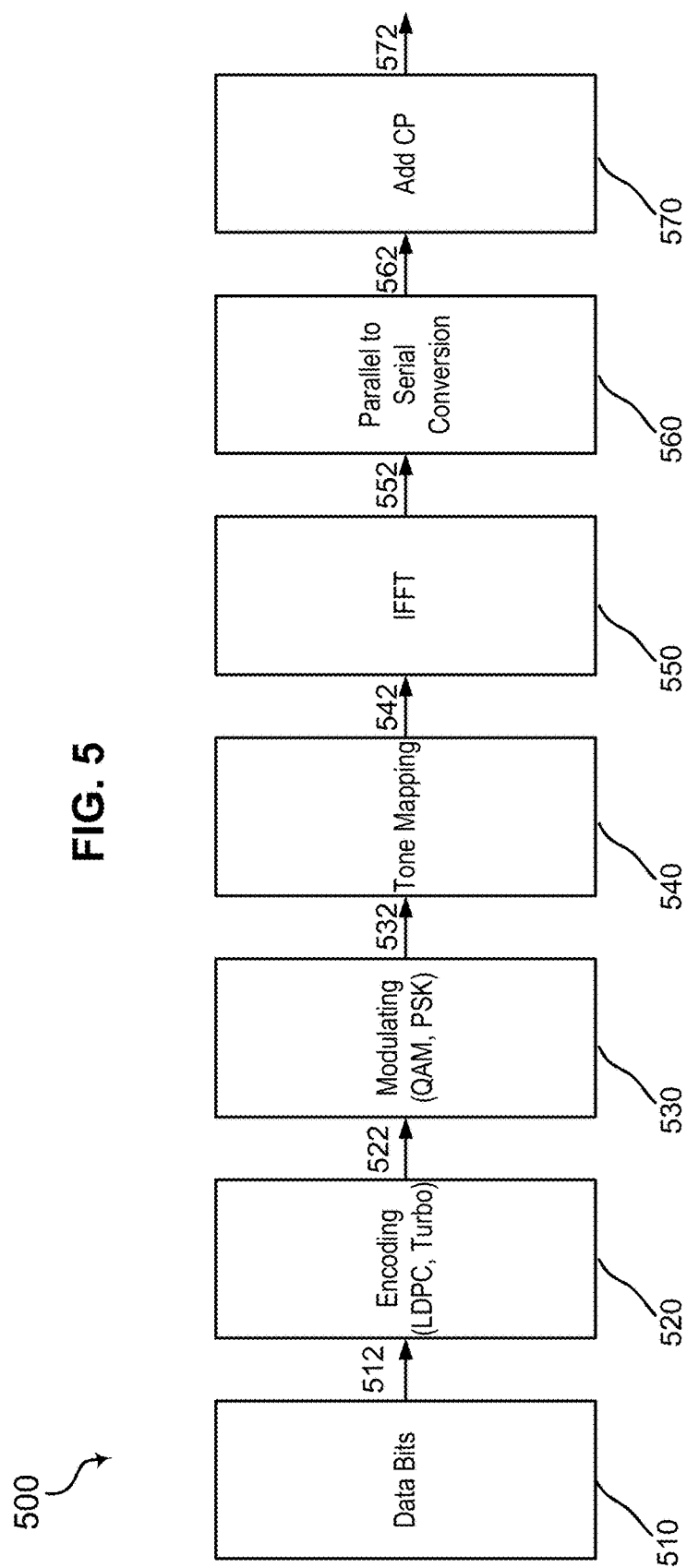
FIG. 5 illustrates an example of a conventional CP-OFDM processing methodology.

FIG. 5 illustrates an example of steps for conventional processing 500 of a CP-OFDM symbol.

For example, at 510, a UE 110 may have data bits 512 for transmission to an eNB 105. Although the present disclosure describes the techniques for reducing ACLR for transmissions from a UE to an eNB, the techniques apply for transmissions from the eNB to the UE as well. At 520, the UE 110 may encode the data bits 512 using, e.g., a low-density parity-check (LDPC) encoder, a turbo encoder, etc. At 530, the encoded data bits 522 may be modulated using, e.g., quadrature amplitude modulation (QAM), phase-shift keying (PSK), etc. to produce a modulated signal 532. At 540, tone mapping may be performed on the modulated signal 532 to produce mapped tones 542. At 550, an inverse fast Fourier transform (IFFT) may be performed on the mapped tones 542 to convert the mapped tones 542 from frequency domain to time domain. At 560, the tones 552 which may be generated simultaneously in the time domain in a parallel manner may be converted as time domain sequences 562, and a CP is added at 570 to produce a CP-OFDM symbol 572, which may be, for example, CP-OFDM symbol1 (410), CP-OFDM symbol2 (420), or CP-OFDM symbol3 (430), as described above in reference to FIG. 4. In an aspect, ACLR component 150/170, transmit processor 316 and/or receive processor 356 may perform tone mapping at 540, IFFT at 550, parallel-to-serial conversion at 560, and/or adding CP at 570 to output CP-OFDM symbol 572, as described herein, to reduce ACLR.

Figure 6:
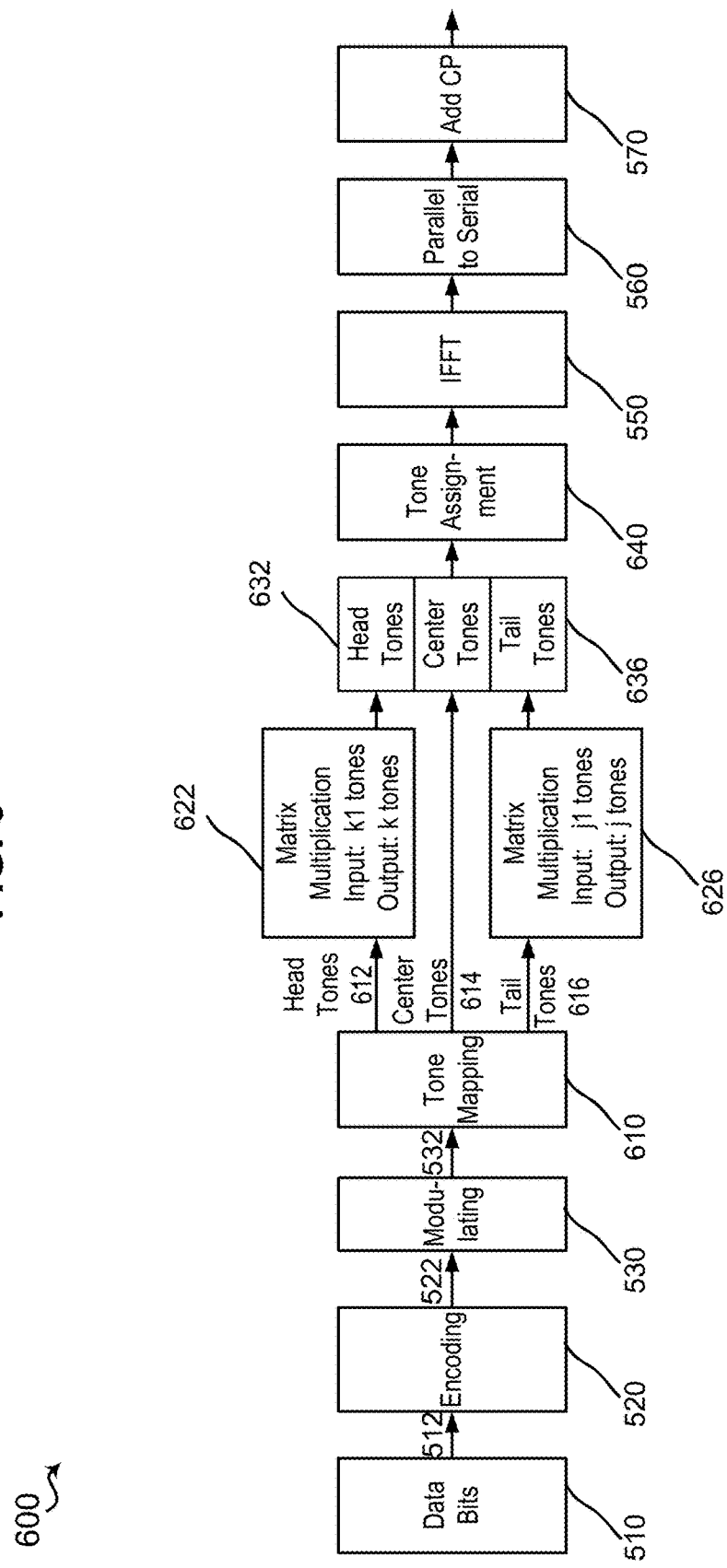
FIG. 6 illustrates an example of a CP-OFDM processing method for reducing ACLR according to an aspect of the present disclosure.

FIG. 6 illustrates an example CP-OFDM processing method 600 for reducing ACLR according to an aspect of the present disclosure. The method in FIG. 6 includes similar procedures as FIG. 5 (e.g., 510, 520, 530, 550, 560, and/or 570) but also includes procedures (e.g., 610, 622, 626, 640, etc.) as described below.

For example, at 610, tone mapping may be performed on the modulated signal 532 to produce a plurality of mapped tones, e.g., head tones 612, center tones 614, and/or tail tones 616. In an aspect, the head tones 612 and/or the tail tones 616 may be one or two symbols (not limited to one or two symbols, may be more symbols) in length and/or are present at the edges (e.g., front end and back end, respectively, e.g., in time or frequency) of the symbols. At 622, a linear matrix multiplication may be performed on the head tones 612, with an input size of "k1" and an output size of "k" (and where k1<k) to output k head tones 632. Similarly, at 626, a linear matrix multiplication may be performed on the tail tones 616, with an input size of IF and an output size of "j" (and where j1<j) to output j tail tones 636, where j may be equal to k and/or j1 may be equal to k1 or otherwise. At 640, tone assignment may be performed by assigning the head tones 632, the center tones 614, and/or the tail tones 636 (in some cases case, assignments may be performed continuously). At 550, an IFFT may be performed on the output of the tone assignment similar to what is described above in reference to FIG. 5.

Figure 7:
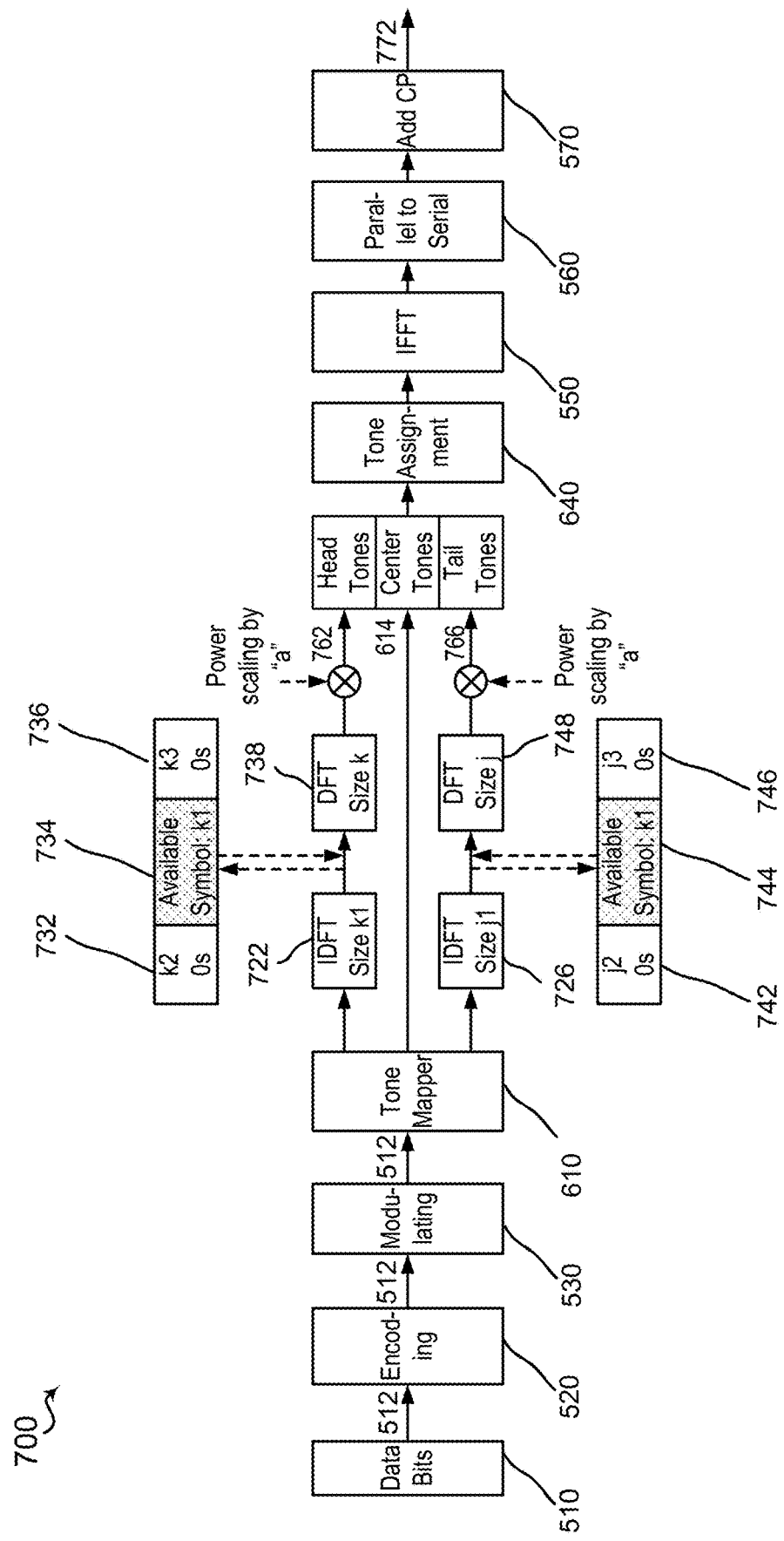
FIG. 7 illustrates an additional example of a CP-OFDM processing method for reducing ACLR according to an aspect of the present disclosure.

FIG. 7 illustrates an additional example of a design 700 for reducing ACLR according to an aspect of the present disclosure. The procedures or processing similar in FIGS. 5 and 6 that apply to FIG. 7 are not described again in the context of FIG. 7. For instance, the procedures or processing associated with 510, 520, 530, 550, 560, 570, and 610 apply to FIG. 6 as well.

At 722, an IDFT of size "k1" may be performed on the head tones 612 to convert samples or tones from frequency domain to symbols in the time domain. That is, k1 symbols in the time domain 734 are produced. Moreover, a "k2" number of zeroes (732) may be inserted at the beginning of the symbol and a "k3" number zeroes (736) may be inserted at the end of the symbol. At 738, a DFT of size k may performed to convert the samples into frequency domain and a power scaling by a factor of "a" to output head tones 762 in the frequency domain.

Similarly, at 726, an IDFT of size j1 may be performed on the tail tones 616 to convert samples or tones from frequency domain to symbols in the time domain. That is, j1 symbols in the time domain 744 are produced. Moreover, a "j2" number of zeroes (742) may be inserted at the beginning of the symbol and a "j3" number zeroes (746) may be inserted at the end of the symbol. At 748, a DFT of size j may performed to convert the samples into frequency domain and a power scaling by a factor of "a" is performed to output the tail tones 766 in the frequency domain.

The head tones 762, the center tones 614, and the tail tones 766 are then further processed as described above with reference to FIGS. 5 and 6 to output a CP-OFDM symbol 772 for transmission to a wireless device. The zero padding of just the head tones 612 and the tail tones 616, and not the center tones 614, reduces ACLR and minimizes the reduction in spectral efficiency when compared to the zero padding of all the tones including the center tones.

Figure 8:
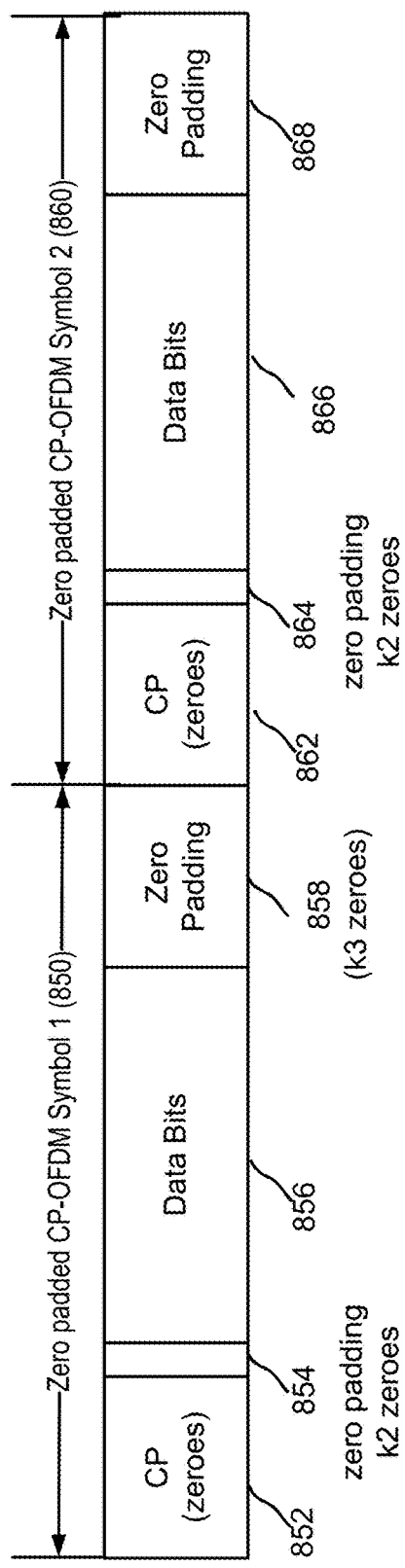
FIG. 8 illustrates an example of an output of FIG. 7 according to aspects of the present disclosure.

FIG. 8 illustrates an example of a representation of an output 800 using the concepts described in FIG. 7 according to aspects of the present disclosure.

In one aspect, for example, the UE 110 and/or the ACLR component 150 may perform zero padding of symbols CP-OFDM symbol1 (410) and CP-OFDM symbol2 (420) to output zero padded symbols including zero padded CP-OFDM symbol1 (850) and zero padded CP-OFDM symbol2 (860), respectively. For example, zero padded CP-OFDM symbol1 (850) may include CP 852, which may include zeroes that are copied from the tail end (e.g., 858) of CP-OFDM symbol1 (850), k2 zeroes (854) that are included as part of the zero padding of the head tones 612 (732 of FIG. 7), data bits 856, and k3 zeroes 858 that are included as part of the zero padding of the tail tones 616 (742 of FIG. 7) (e.g., as part of a CP operation). In an additional example, a zero padded CP-OFDM symbol2 (860) may include CP 862 which may contain zeroes that are copied from the tail end (e.g., 868) of zero padded CP-OFDM symbol2 (860), k2 zeroes (864) that are included as part of the zero padding of the head tones, data bits 866, and k3 zeroes 868 that are included as part of the zero padding of the tail tones.

The zero padding of CP-OFDM symbols at the edges of the symbols provides for a smooth transition at the symbol boundaries and reduces or minimizes ACLR at a wireless device (e.g., UE 110 or eNB 105).

Figure 9:
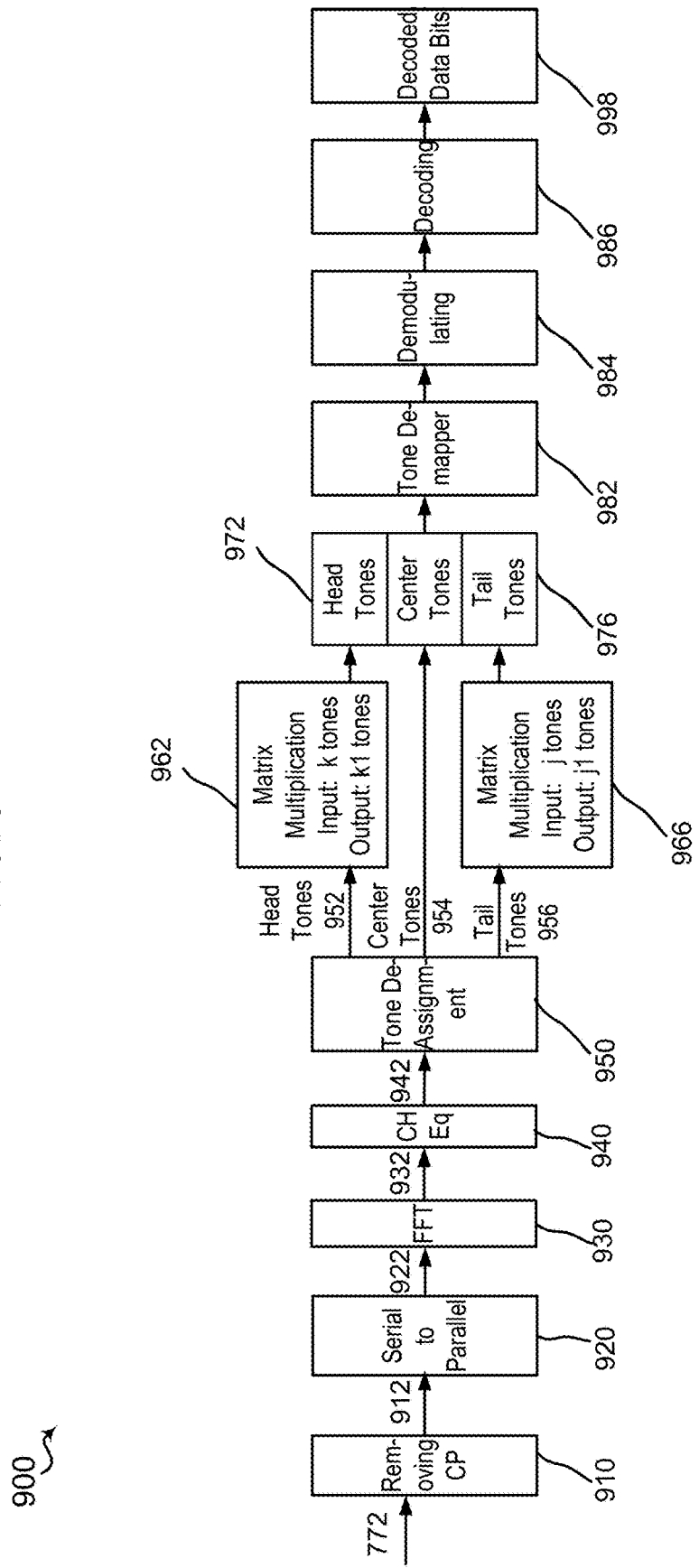
FIG. 9 illustrates an example of a CP-OFDM processing method for reducing ACLR according to an aspect of the present disclosure.

FIG. 9 illustrates an example of a design 900 for reducing ACLR according to an aspect of the present disclosure.

For example, at 910, upon receiving the zero padded CP-OFDM symbol 772 (which may include one or more symbols) from the UE 110, eNB 105 and/or ACLR component 170 may remove the CP from the zero padded CP-OFDM symbol 772 to output 912. At 920, the output 912 may be converted from a serial format to a parallel format to output 922. At 930, a FFT may be performed on the output 922 to output 932 which is in the frequency domain and channel equalized at 940 to output 942. At 950, a tone de-assignment may be performed to partition the tones into head tones 952, center tones 954, and tail tones 956.

At 962, a linear matrix multiplication may be performed on the head tones 952, with an input size of "k" (or k tones) and an output size of "k1" (e.g., with k<k) to output k1 head tones 972. Similarly, at 966, a linear matrix multiplication may be performed on the tail tones 956, with an input size of j and an output size of j1 (and where j1<j) to output j1 tail tones 976, where j may be equal to k and/or j1 may be equal to k1 or otherwise. At 982, the head tones 972, the center tones 954, and the tail tones 976 may be de-mapped by a tone de-mapper, demodulated at 982, and decoded at 986 (e.g., LDPC decode, a turbo decoder, etc.) to retrieve data bits transmitted from the UE 110 decoded at 988.

In an aspect, ACLR component 170, transmit processor 316 and/or receive processor 356 may perform removing CP at 910, serial-to-parallel conversion at 920, FFT 930, channel equalization 940, tone de-assignment 950, matrix multiplications 962/966, tone de-mapping 982, demodulating 984, decoding 986, and/or retrieve decoded data bits 998.

Figure 10:
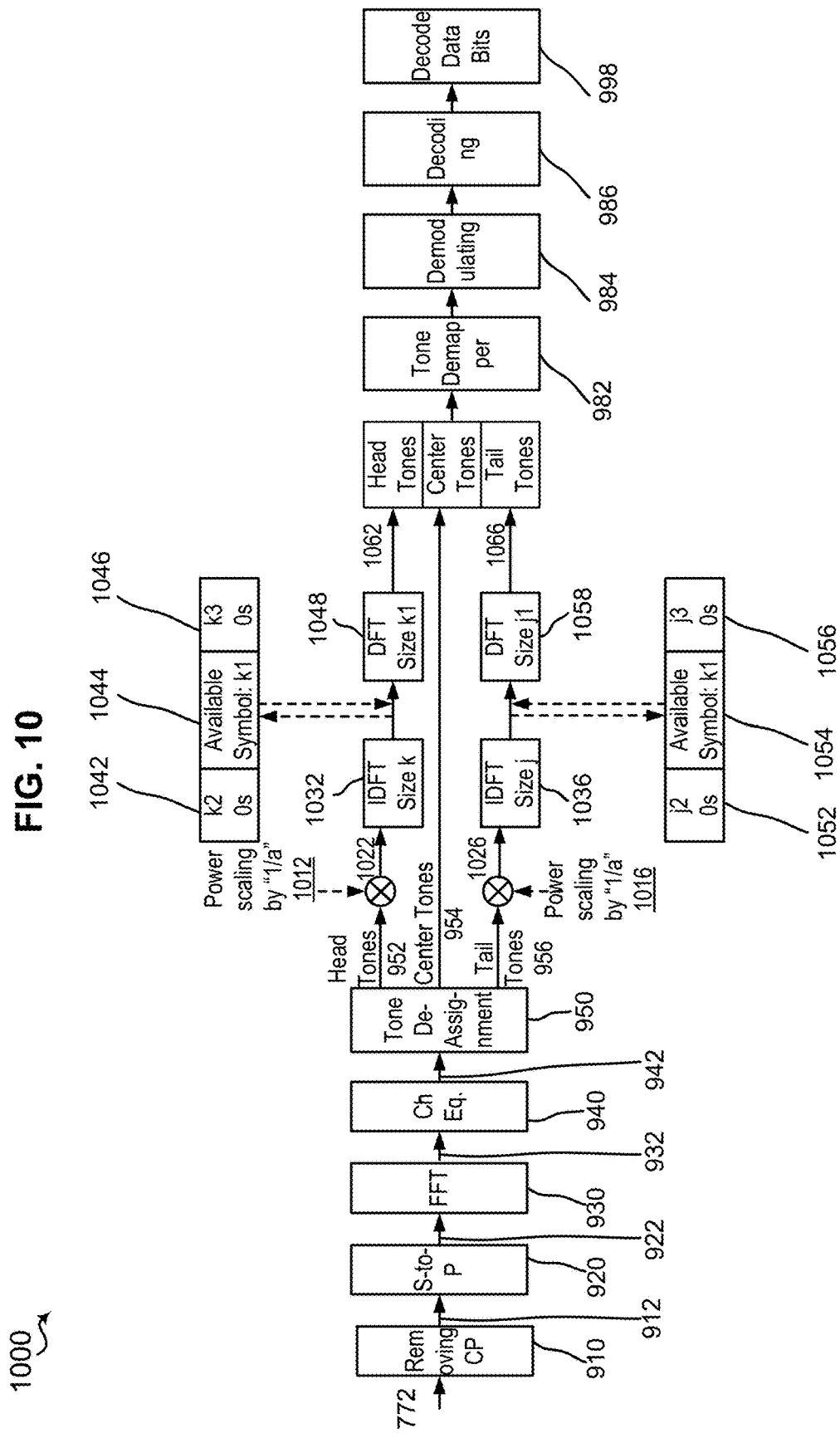
FIG. 10 illustrates an additional an example of a CP-OFDM processing method for reducing ACLR according to an aspect of the present disclosure.

FIG. 10 illustrates an additional example of a design 1000 for reducing ACLR according to an aspect of the present disclosure. The procedures or processing similar in FIG. 9 that apply to FIG. 10 are not described again in the context of FIG. 10. For instance, the procedures or processing associated with 910, 920, 930, 940, and 950 apply to FIG. 10 as well.

At 1012, power scaling by a factor of "1/a" is performed on the head tones 952 to output 1022. At 1016, power scaling by a factor of "1/a" is performed on the tail tones 956 to output 1026. At 1032, an IDFT of size k may be performed on the power scaled head tones 1022 to convert samples or tones from frequency domain to symbols in the time domain. That is, k1 symbols 1044 in the time domain are produced. Moreover, a k2 number of zeroes (1042) may be detected (e.g., and/or removed) at the beginning of the symbol and a k3 number zeroes (1046) may be detected (e.g., and/or removed) at the end of the symbol. At 1048, a DFT of size k1 may performed to convert the samples into frequency domain and output head tones 1062.

Similarly, at 1036, an IDFT of size j may be performed on the power scaled tail tones 1026 to convert samples or tones from frequency domain to symbols in the time domain. That is, j1 symbols 1054 in the time domain are produced. Moreover, a j2 number of zeroes (1052) may be detected (e.g., and/or removed) at the beginning of the symbol and a j3 number zeroes (1056) may be detected (e.g., and/or removed) at the end of the symbol. At 1058, a DFT of size j1 may performed to convert the samples into frequency domain and output tail tones 1066.

The head tones 1062, the center tones 954, and the tail tones 1066 are then further processed as described above with reference to FIGS. 9 and 10 to output decoded data bits that are transmitted from the UE 110. The zero padding of just the head tones 952 and the tail tones 956, and not the center tones 954, reduces ACLR and minimizes the reduction in spectral efficiency when compared to the zero padding of all the tones including the center tones at a receiving device, e.g., eNB 105.

Figure 11:
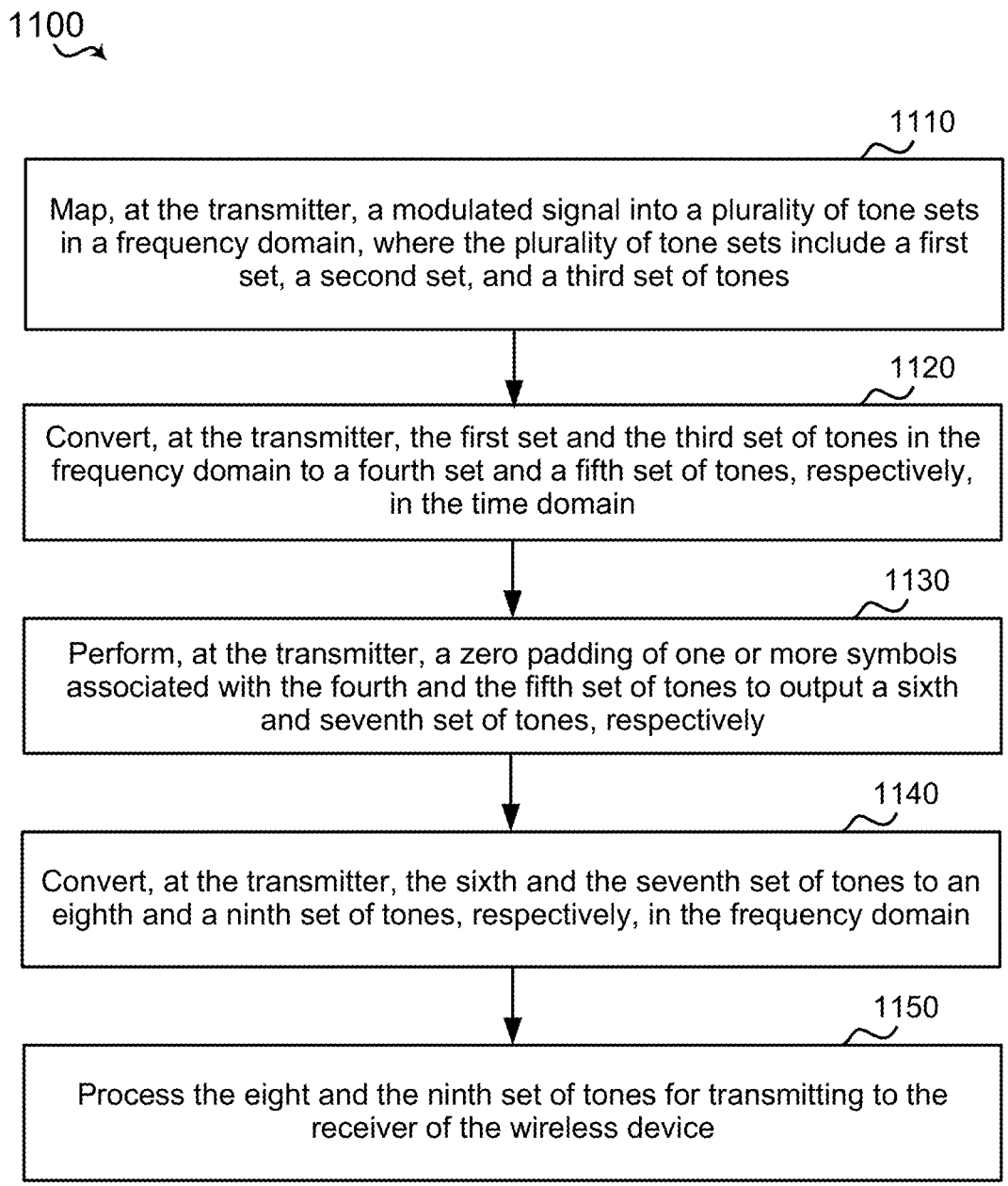
FIG. 11 is a flow diagram of an example method of configuring uplink power control at a UE, according to an aspect of the present disclosure.

Referring to FIG. 11, for example, a method 1100 of wireless communication in operating UE 110 according to the above-described aspects to reduce ACLR at a transmitter of the UE 110 is disclosed.

In an aspect, at block 1110, method 1100 may include mapping, at the transmitter, a modulated signal into a plurality of tone sets in a frequency domain, where the plurality of tone sets include a first set, a second set, and a third set of tones. For example, in an aspect, the UE 110 and/or ACLR component 150 may include a mapping component 152, such as a specially programmed processor module, or a processor executing specially programmed code stored in a memory, to map, at the transmitter, a modulated signal into a plurality of tone sets in a frequency domain, where the plurality of tone sets include a first set (e.g., head tones), a second set (e.g., center tones), and a third set (e.g., tail tones) of tones.

In an aspect, at block 1120, method 1100 may include converting, at the transmitter, the first (e.g., head tones) and the third (e.g., tail tones) set of tones in the frequency domain to a fourth and a fifth set of tones, respectively, in a time domain. For example, in an aspect, the UE 110 and/or ACLR component 150 may include a converting component 154, such as a specially programmed processor module, or a processor executing specially programmed code stored in a memory, to convert, at the transmitter, the first and the third set of tones in the frequency domain to a fourth and a fifth set of tones, respectively, in a time domain.

In an aspect, at block 1130, method 1100 may include performing, at the transmitter, a zero padding of one or more symbols associated with the fourth and the fifth set of tones to output a sixth and a seventh set of tones, respectively. For example, in an aspect, the UE 110 and/or ACLR component 150 may include a zero padding component 156, such as a specially programmed processor module, or a processor executing specially programmed code stored in a memory, to perform, at the transmitter, a zero padding of one or more symbols associated with the fourth and the fifth set of tones to output a sixth and a seventh set of tones, respectively. As described, for example, the ACLR component 150 can zero pad one or more head tomes and/or tail tones in the fourth and/or fifth sets of tones by performing an IDFT of the sets of tones, adding one or more zeroed symbols at the edges.

In an aspect, at block 1140, method 1100 may include converting, at the transmitter, the sixth and the seventh set of tones to an eighth and a ninth set of tones, respectively, in the frequency domain. For example, in an aspect, the UE 110 and/or ACLR component 150 may include the converting component 154, such as a specially programmed processor module, or a processor executing specially programmed code stored in a memory, to convert, at the transmitter, the sixth and the seventh set of tones to an eighth and a ninth set of tones, respectively, in the frequency domain. For example, ACLR component 150 can perform a DFT over the symbols with the added zeroed symbols.

In an aspect, at block 1150, method 1100 may include processing the eighth and the ninth set of tones for transmitting to another wireless device. For example, in an aspect, the UE 110 and/or ACLR component 150 may include a processing component 158, such as a specially programmed processor module, or a processor executing specially programmed code stored in a memory, to process the eighth and the ninth set of tones for transmitting to another wireless device (e.g., eNB 105).

Although FIG. 11 is described in the context of the UE 110, the method applies to eNB 105 as well (e.g., eNB 105 as a transmitter).

Figure 12:
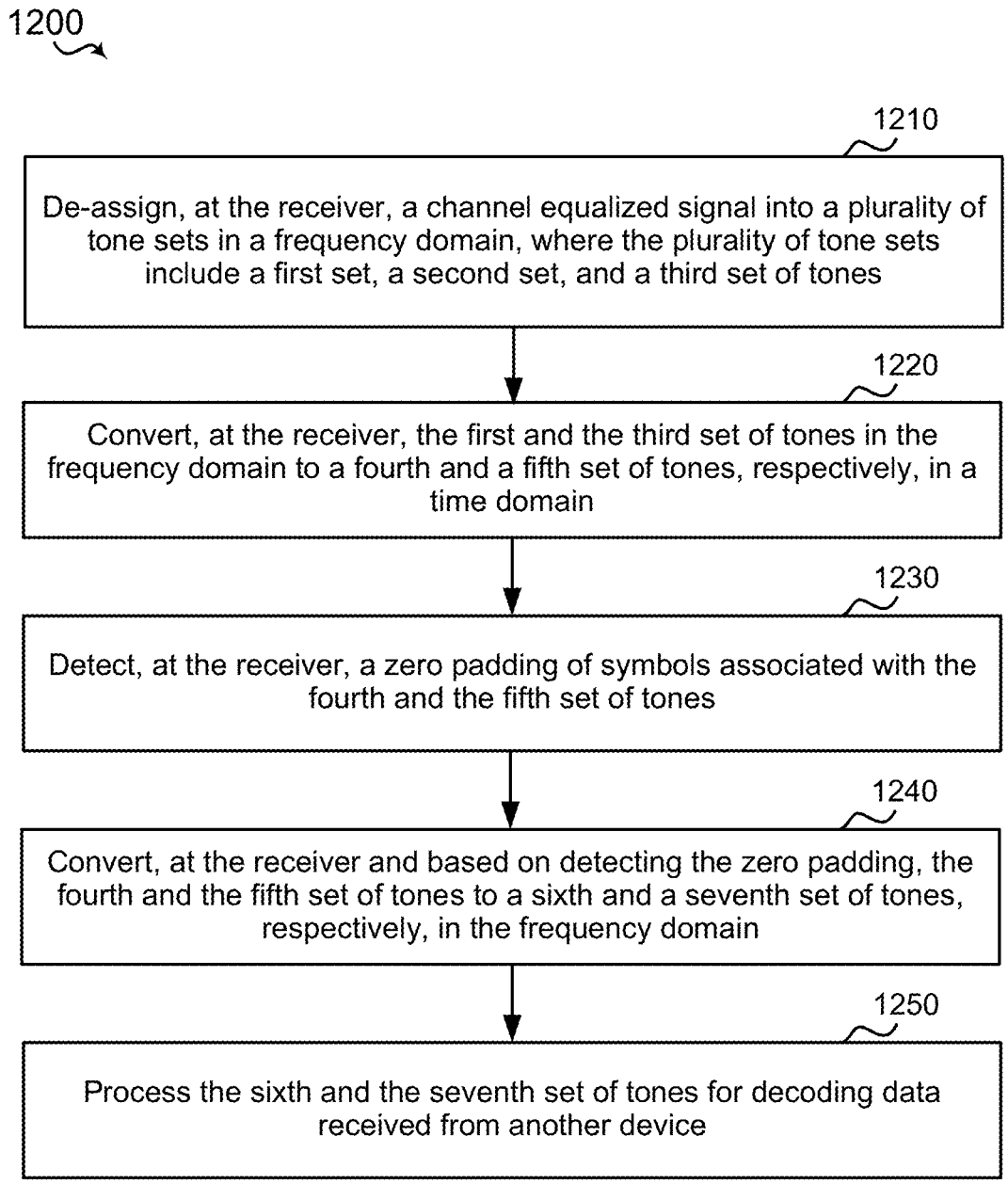
FIG. 12 is a flow diagram of an example method of configuring uplink power control at a UE, according to an aspect of the present disclosure.

Referring to FIG. 12, for example, a method 1200 of wireless communication in operating eNB 105 according to the above-described aspects to reduce ACLR at a receiver of the eNB is disclosed.

In an aspect, at block 1210, method 1200 may include de-assigning, at the receiver, a channel equalized signal into a plurality of tone sets in a frequency domain, where the plurality of tone sets include a first, a second, and a third set of tones, and where the first, the second, and the third set of tones are associated with head tones, center tones, and tail tones, respectively. For example, in an aspect, the eNB 105 and/or ACLR component 170 may include a mapping component 172, such as a specially programmed processor module, or a processor executing specially programmed code stored in a memory, to de-assign, at the receiver, a channel equalized signal into a plurality of tone sets in a frequency domain, where the plurality of tone sets include a first, a second, and a third set of tones. The first, the second, and the third set of tones are associated with head tones (952), center tones (954), and tail tones (956), respectively.

In an aspect, at block 1220, method 1200 may include converting, at the receiver, the first and the third set of tones in the frequency domain to a fourth and a fifth set of tones, respectively, in a time domain. For example, in an aspect, the eNB 105 and/or ACLR component 170 may include a converting component 174, such as a specially programmed processor module, or a processor executing specially programmed code stored in a memory, to convert, at the receiver, the first and the third set of tones in the frequency domain to a fourth and a fifth set of tones, respectively, in a time domain.

In an aspect, at block 1230, method 1200 may include detecting, at the receiver, a zero padding of symbols associated with the fourth and the fifth set of tones. For example, in an aspect, the eNB 105 and/or ACLR component 170 may include a zero padding component 176, such as a specially programmed processor module, or a processor executing specially programmed code stored in a memory, to detect, at the receiver, a zero padding of symbols associated with the fourth and the fifth set of tones. This may include zero padding component 176 detecting a number of zeroes at the edges of the fourth and fifth set of tones, stripping a known or otherwise configured number of zeroes at the edges, etc.

In an aspect, at block 1240, method 1200 may include converting, at the receiver, the fourth and the fifth set of tones to a sixth and a seventh set of tones, respectively, in the frequency domain. For example, in an aspect, the eNB 105 and/or ACLR component 170 may include the converting component 174, such as a specially programmed processor module, or a processor executing specially programmed code stored in a memory, to convert, at the receiver, the fourth and the fifth of tones to a sixth and a seventh set of tones, respectively, in the frequency domain.

In an aspect, at block 1250, method 1200 may include processing the sixth and the seventh set of tones for decoding data received from another wireless device. For example, in an aspect, the eNB 105 and/or ACLR component 150 may include a processing component 178, such as a specially programmed processor module, or a processor executing specially programmed code stored in a memory, to processing the sixth and the seventh set of tones (e.g., along with the second set of tones, e.g., the center tones, as described) for decoding data received from another wireless device.

Although FIG. 12 is described in the context of the eNB 105, the method 1200 applies to the UE 110 as well (e.g., UE 110 as a receiver).

Figure 13:
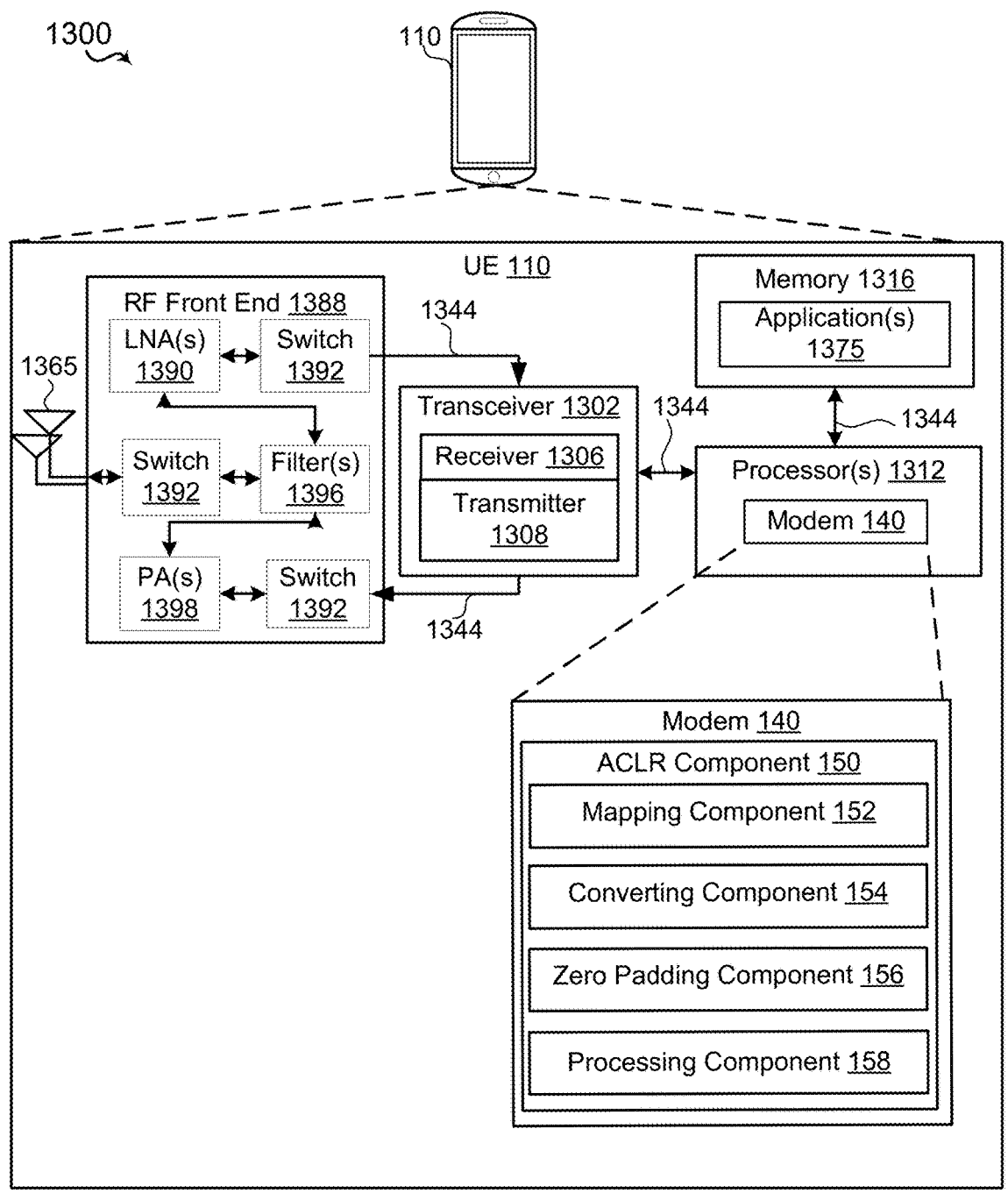
FIG. 13 is a schematic diagram of example components of the UE of FIG. 1.

Referring to FIG. 13, one example of an implementation of UE 110 may include a variety of components, some of which have already been described above, but including components such as one or more processors 1312 and memory 1316 and transceiver 1302 in communication via one or more buses 1344, which may operate in conjunction with modem 140 and ACLR component 150 to reduce ACLR at a transmitter 1308 or a receiver 1306 of the UE 110. Further, the one or more processors 1312, modem 1314, memory 1316, transceiver 1302, RF front end 1388 and one or more antennas 1365, may be configured to support voice and/or data calls (simultaneously or non-simultaneously) in one or more radio access technologies.

In an aspect, the one or more processors 1312 can include a modem 140 that uses one or more modem processors. The various functions related to ACLR component 150 may be included in modem 140 and/or processors 1312 and, in an aspect, can be executed by a single processor, while in other aspects, different ones of the functions may be executed by a combination of two or more different processors. For example, in an aspect, the one or more processors 1312 may include any one or any combination of a modem processor, or a baseband processor, or a digital signal processor, or a transmit processor, or a receiver processor, or a transceiver processor associated with transceiver 1302. In other aspects, some of the features of the one or more processors 1312 and/or modem 140 associated with ACLR component 150 may be performed by transceiver 1302.

Also, memory 1316 may be configured to store data used herein and/or local versions of applications 1375 or ACLR component 150 and/or one or more of its subcomponents being executed by at least one processor 1312. Memory 1316 can include any type of computer-readable medium usable by a computer or at least one processor 1312, such as random access memory (RAM), read only memory (ROM), tapes, magnetic discs, optical discs, volatile memory, non-volatile memory, and any combination thereof. In an aspect, for example, memory 1316 may be a non-transitory computer-readable storage medium that stores one or more computer-executable codes defining ACLR component 150 and/or one or more of its subcomponents, and/or data associated therewith, when the UE 110 is operating at least one processor 1312 to execute ACLR component 150 and/or one or more of its subcomponents.

Transceiver 1302 may include at least one receiver 1306 and at least one transmitter 1308. Receiver 1306 may include hardware, firmware, and/or software code executable by a processor for receiving data, the code comprising instructions and being stored in a memory (e.g., computer-readable medium). Receiver 1306 may be, for example, a radio frequency (RF) receiver. In an aspect, receiver 1306 may receive signals transmitted by at least one base station 105. Additionally, receiver 1306 may process such received signals, and also may obtain measurements of the signals, such as, but not limited to, Ec/Io, SNR, RSRP, RSSI, etc. Transmitter 1308 may include hardware, firmware, and/or software code executable by a processor for transmitting data, the code comprising instructions and being stored in a memory (e.g., computer-readable medium). A suitable example of transmitter 1308 may including, but is not limited to, an RF transmitter.

Moreover, in an aspect, UE 110 may include RF front end 1388, which may operate in communication with one or more antennas 1365 and transceiver 1302 for receiving and transmitting radio transmissions, for example, wireless communications transmitted by at least one base station 105 or wireless transmissions transmitted by UE 110. RF front end 1388 may be connected to one or more antennas 1365 and can include one or more low-noise amplifiers (LNAs) 1390, one or more switches 1392, one or more power amplifiers (PAs) 1398, and one or more filters 1396 for transmitting and receiving RF signals.

In an aspect, LNA 1390 can amplify a received signal at a desired output level. In an aspect, each LNA 1390 may have a specified minimum and maximum gain values. In an aspect, RF front end 1388 may use one or more switches 1392 to select a particular LNA 1390 and its specified gain value based on a desired gain value for a particular application.

Further, for example, one or more PA(s) 1398 may be used by RF front end 1388 to amplify a signal for an RF output at a desired output power level. In an aspect, each PA 1398 may have specified minimum and maximum gain values. In an aspect, RF front end 1388 may use one or more switches 1392 to select a particular PA 1398 and its specified gain value based on a desired gain value for a particular application.

Also, for example, one or more filters 1396 can be used by RF front end 1388 to filter a received signal to obtain an input RF signal. Similarly, in an aspect, for example, a respective filter 1396 can be used to filter an output from a respective PA 1398 to produce an output signal for transmission. In an aspect, each filter 1396 can be connected to a specific LNA 1390 and/or PA 1398. In an aspect, RF front end 1388 can use one or more switches 1392 to select a transmit or receive path using a specified filter 1396, LNA 1390, and/or PA 1398, based on a configuration as specified by transceiver 1302 and/or processor 1312.

As such, transceiver 1302 may be configured to transmit and receive wireless signals through one or more antennas 1365 via RF front end 1388. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1302 to operate at a specified frequency and power level based on the UE configuration of the UE 110 and the communication protocol used by modem 140.

In an aspect, modem 140 can be a multiband-multimode modem, which can process digital data and communicate with transceiver 1302 such that the digital data is sent and received using transceiver 1302. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1388, transceiver 1302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 14:
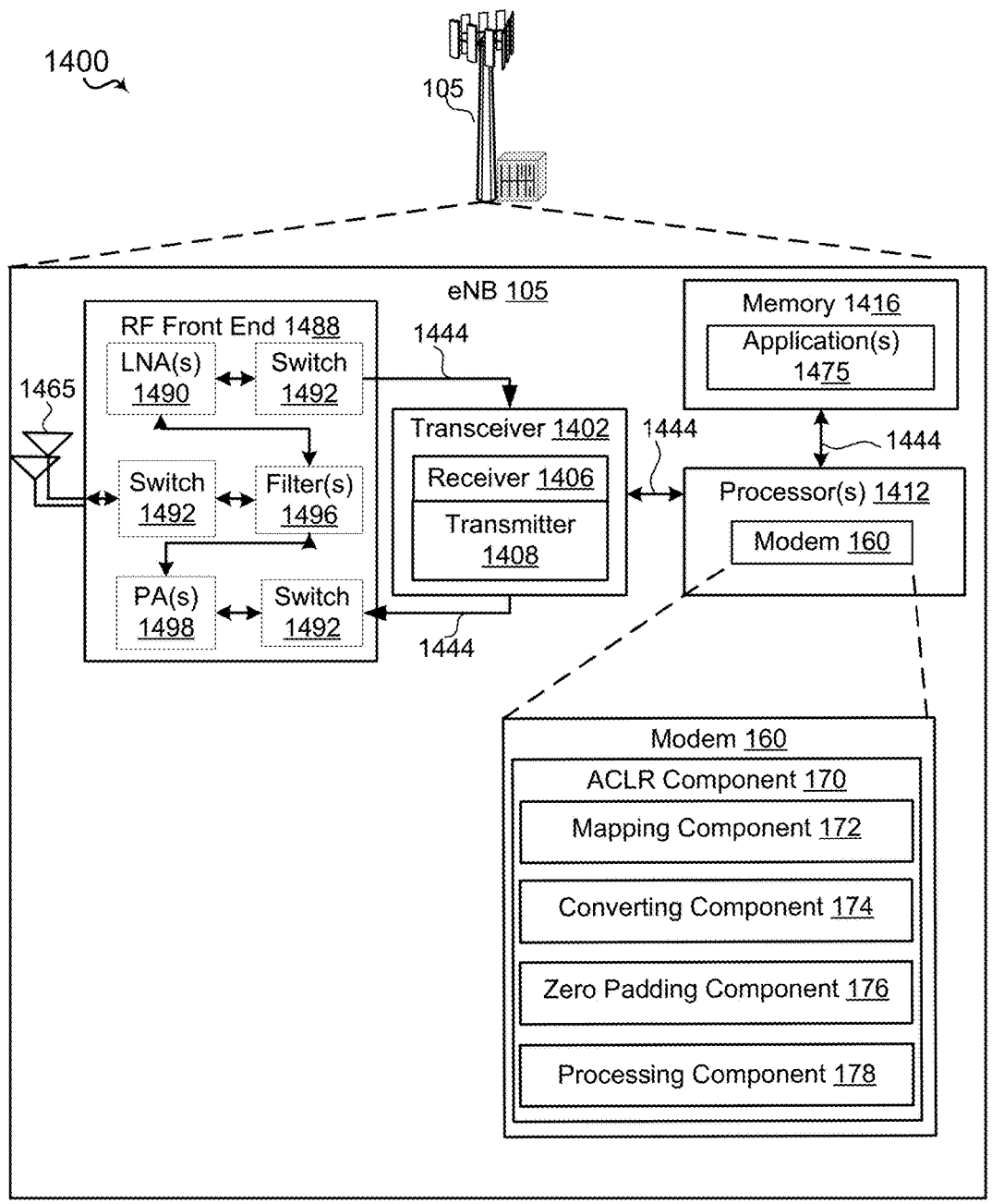
FIG. 14 is a schematic diagram of example components of the eNB of FIG. 1.

Referring to FIG. 14, one example of an implementation of eNB 105 may include a variety of components, some of which have already been described above, but including components such as one or more processors 1412 and memory 1416 and transceiver 1402 in communication via one or more buses 1444, which may operate in conjunction with modem 160 and ACLR component 170 to reduce ACLR at a transmitter 1408 or a receiver 1406 of the eNB 105. Further, the one or more processors 1412, modem 1414, memory 1416, transceiver 1402, RF front end 1488 and one or more antennas 1465, may be configured to support voice and/or data calls (simultaneously or non-simultaneously) in one or more radio access technologies.

In an aspect, the one or more processors 1412 can include a modem 160 that uses one or more modem processors. The various functions related to ACLR component 170 may be included in modem 160 and/or processors 1412 and, in an aspect, can be executed by a single processor, while in other aspects, different ones of the functions may be executed by a combination of two or more different processors. For example, in an aspect, the one or more processors 1412 may include any one or any combination of a modem processor, or a baseband processor, or a digital signal processor, or a transmit processor, or a receiver processor, or a transceiver processor associated with transceiver 1402. In other aspects, some of the features of the one or more processors 1412 and/or modem 160 associated with ACLR component 170 may be performed by transceiver 1402.

Also, memory 1416 may be configured to store data used herein and/or local versions of applications 1475 or ACLR component 170 and/or one or more of its subcomponents being executed by at least one processor 1412. Memory 1416 can include any type of computer-readable medium usable by a computer or at least one processor 1412, such as random access memory (RAM), read only memory (ROM), tapes, magnetic discs, optical discs, volatile memory, non-volatile memory, and any combination thereof. In an aspect, for example, memory 1416 may be a non-transitory computer-readable storage medium that stores one or more computer-executable codes defining ACLR component 170 and/or one or more of its subcomponents, and/or data associated therewith, when eNB 105 is operating at least one processor 1412 to execute ACLR component 170 and/or one or more of its subcomponents.

Transceiver 1402 may include at least one receiver 1406 and at least one transmitter 1408. Receiver 1406 may include hardware, firmware, and/or software code executable by a processor for receiving data, the code comprising instructions and being stored in a memory (e.g., computer-readable medium). Receiver 1406 may be, for example, a radio frequency (RF) receiver. In an aspect, receiver 1406 may receive signals transmitted by at least one eNB 105. Additionally, receiver 1406 may process such received signals, and also may obtain measurements of the signals, such as, but not limited to, Ec/Io, SNR, RSRP, RSSI, etc. Transmitter 1408 may include hardware, firmware, and/or software code executable by a processor for transmitting data, the code comprising instructions and being stored in a memory (e.g., computer-readable medium). A suitable example of transmitter 1408 may including, but is not limited to, an RF transmitter.

Moreover, in an aspect, eNB 105 may include RF front end 1488, which may operate in communication with one or more antennas 1465 and transceiver 1402 for receiving and transmitting radio transmissions, for example, wireless communications transmitted by at least one eNB 105 or wireless transmissions transmitted by UE 110. RF front end 1488 may be connected to one or more antennas 1465 and can include one or more low-noise amplifiers (LNAs) 1490, one or more switches 1492, one or more power amplifiers (PAs) 1498, and one or more filters 1496 for transmitting and receiving RF signals.

In an aspect, LNA 1490 can amplify a received signal at a desired output level. In an aspect, each LNA 1490 may have a specified minimum and maximum gain values. In an aspect, RF front end 1488 may use one or more switches 1492 to select a particular LNA 1490 and its specified gain value based on a desired gain value for a particular application.

Further, for example, one or more PA(s) 1498 may be used by RF front end 1488 to amplify a signal for an RF output at a desired output power level. In an aspect, each PA 1498 may have specified minimum and maximum gain values. In an aspect, RF front end 1488 may use one or more switches 1492 to select a particular PA 1498 and its specified gain value based on a desired gain value for a particular application.

Also, for example, one or more filters 1496 can be used by RF front end 1488 to filter a received signal to obtain an input RF signal. Similarly, in an aspect, for example, a respective filter 1496 can be used to filter an output from a respective PA 1498 to produce an output signal for transmission. In an aspect, each filter 1496 can be connected to a specific LNA 1490 and/or PA 1498. In an aspect, RF front end 1488 can use one or more switches 1492 to select a transmit or receive path using a specified filter 1496, LNA 1490, and/or PA 1498, based on a configuration as specified by transceiver 1402 and/or processor 1412.

As such, transceiver 1402 may be configured to transmit and receive wireless signals through one or more antennas 1465 via RF front end 1488. In an aspect, transceiver may be tuned to operate at specified frequencies such that eNB 105 can communicate with, for example, one or more eNBs 105 or one or more cells associated with one or more eNB 105. In an aspect, for example, modem 160 can configure transceiver 1402 to operate at a specified frequency and power level based on the eNB configuration and the communication protocol used by modem 160.

In an aspect, modem 160 can be a multiband-multimode modem, which can process digital data and communicate with transceiver 1402 such that the digital data is sent and received using transceiver 1402. In an aspect, modem 160 can be multiband and be configured to support multiple frequency bands for a specific communications protocol. In an aspect, modem 160 can be multimode and be configured to support multiple operating networks and communications protocols. In an aspect, modem 160 can control one or more components of eNB 105 (e.g., RF front end 1488, transceiver 1402) to enable transmission and/or reception of signals from the network based on a specified modem configuration. In an aspect, the modem configuration can be based on the mode of the modem and the frequency band in use.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of reducing adjacent channel leakage-power ratio (ACLR) at a transmitter of a wireless device, comprising:
    mapping, at the transmitter, a modulated signal into a plurality of tone sets in a frequency domain, wherein the plurality of tone sets include a first, a second, and a third set of tones;
    converting, at the transmitter, the first and the third set of tones in the frequency domain to a fourth and a fifth set of tones, respectively, in a time domain;
    performing, at the transmitter, a zero padding of one or more symbols associated with the fourth and the fifth set of tones to output a sixth and a seventh set of tones, respectively;
    converting, at the transmitter, the sixth and the seventh set of tones to an eighth and a ninth set of tones, respectively, in the frequency domain; and
    processing the eighth and the ninth set of tones for transmitting to another wireless device.

2. The method of claim 1, wherein the first, the second, and the third set of tones are associated with head tones, center tones, and tail tones, respectively.

3. The method of claim 1, wherein converting the first and the third set of tones to the fourth and the fifth set of tones, respectively, comprises:
    performing an inverse discrete Fourier transform (IDFT) on the first and the second set of tones, wherein the IDFT is of a first size.

4. The method of claim 3, wherein converting the sixth and the seventh set of tones to the eighth and the ninth set of tones, respectively, comprises:
    performing a discrete Fourier transform (DFT) on the sixth and the seventh set of tones, wherein the DFT is of a second size, and wherein the second size is greater than the first size.

5. The method of claim 1, wherein the performing the zero padding of the symbols associated with the fourth set of tones to output the sixth set of tones further comprises:
    adding a first number of zeroes before the fourth set of tones and a second number of zeroes after the fourth set of tones.

6. The method of claim 5, wherein the adding the first number of zeroes before the fourth set of tones comprises performing a cyclic prefix operation to add the second number of zeroes after the fourth set of tones as the first number of zeroes before the fourth set of tones.

7. The method of claim 1, wherein the performing the zero padding of the symbols associated with the fifth set of tones to output the seventh set of tones further comprises:
    adding a first number of zeroes before the fifth set of tones and a second number of zeroes after the fifth set of tones.

8. The method of claim 7, wherein the adding the first number of zeroes before the fifth set of tones comprises performing a cyclic prefix operation to add the second number of zeroes after the fifth set of tones as the first number of zeroes before the fifth set of tones.

9. An apparatus for reducing adjacent channel leakage-power ratio (ACLR) at a transmitter, comprising:
    a transceiver for communicating one or more wireless signals via at least the transmitter and one or more antennas;
    a memory configured to store instructions; and
    one or more processors communicatively coupled with the transceiver and the memory, wherein the one or more processors are configured to:
        map a modulated signal into a plurality of tone sets in a frequency domain, wherein the plurality of tone sets include a first, a second, and a third set of tones;
        convert the first and the third set of tones in the frequency domain to a fourth and a fifth set of tones, respectively, in a time domain;
        perform a zero padding of one or more symbols associated with the fourth and the fifth set of tones to output a sixth and a seventh set of tones, respectively;

convert the sixth and the seventh set of tones to an eighth and a ninth set of tones, respectively, in the frequency domain; and process the eighth and the ninth set of tones for transmitting to another wireless device.

10. The apparatus of claim 9, wherein the first, the second, and the third set of tones are associated with head tones, center tones, and tail tones, respectively.

11. The apparatus of claim 9, wherein the one or more processors are configured to convert the first and the third set of tones to the fourth and the fifth set of tones, respectively, at least in part by:

performing an inverse discrete Fourier transform (IDFT) on the first and the second set of tones, wherein the IDFT is of a first size.

12. The apparatus of claim 11, wherein the one or more processors are configured to convert the sixth and the seventh set of tones to the eighth and the ninth set of tones, respectively, at least in part by:

performing a discrete Fourier transform (DFT) on the sixth and the seventh set of tones, wherein the DFT is of a second size, and wherein the second size is greater than the first size.

13. The apparatus of claim 9, wherein the one or more processors are configured to perform the zero padding of the symbols associated with the fourth set of tones to output the sixth set of tones further at least in part by:

adding a first number of zeroes before the fourth set of tones and a second number of zeroes after the fourth set of tones.

14. The apparatus of claim 13, wherein the adding the first number of zeroes before the fourth set of tones comprises performing a cyclic prefix operation to add the second number of zeroes after the fourth set of tones as the first number of zeroes before the fourth set of tones.

15. The apparatus of claim 9, wherein the one or more processors are configured to perform zero padding of the symbols associated with the fifth set of tones to output the seventh set of tones further at least in part by:

adding a first number of zeroes before the fifth set of tones and a second number of zeroes after the fifth set of tones.

16. The apparatus of claim 15, wherein the adding the first number of zeroes before the fifth set of tones comprises performing a cyclic prefix operation to add the second number of zeroes after the fifth set of tones as the first number of zeroes before the fifth set of tones.

17. An apparatus for reducing adjacent channel leakage-power ratio (ACLR) at a transmitter, comprising:

means for mapping a modulated signal into a plurality of tone sets in a frequency domain, wherein the plurality of tone sets include a first, a second, and a third set of tones;

means for converting the first and the third set of tones in the frequency domain to a fourth and a fifth set of tones, respectively, in a time domain;

means for performing a zero padding of one or more symbols associated with the fourth and the fifth set of tones to output a sixth and a seventh set of tones, respectively;

means for converting the sixth and the seventh set of tones to an eighth and a ninth set of tones, respectively, in the frequency domain; and means for processing the eighth and the ninth set of tones for transmitting to another wireless device.

18. The apparatus of claim 17, wherein the first, the second, and the third set of tones are associated with head tones, center tones, and tail tones, respectively.

19. The apparatus of claim 17, wherein the means for converting the first and the third set of tones to the fourth and the fifth set of tones, respectively, comprises:

means for performing an inverse discrete Fourier transform (IDFT) on the first and the second set of tones, wherein the IDFT is of a first size.

20. The apparatus of claim 19, wherein the means for converting the sixth and the seventh set of tones to the eighth and the ninth set of tones, respectively, comprises:

means for performing a discrete Fourier transform (DFT) on the sixth and the seventh set of tones, wherein the DFT is of a second size, and wherein the second size is greater than the first size.

21. The apparatus of claim 17, wherein the means for performing the zero padding of the symbols associated with the fourth set of tones to output the sixth set of tones further comprises:

means for adding a first number of zeroes before the fourth set of tones and a second number of zeroes after the fourth set of tones.

22. The apparatus of claim 21, wherein the means for adding the first number of zeroes before the fourth set of tones comprises means for performing a cyclic prefix operation to add the second number of zeroes after the fourth set of tones as the first number of zeroes before the fourth set of tones.

23. The apparatus of claim 17, wherein the means for performing the zero padding of the symbols associated with the fifth set of tones to output the seventh set of tones further comprises:

means for adding a first number of zeroes before the fifth set of tones and a second number of zeroes after the fifth set of tones.

24. A non-transitory computer-readable medium, comprising code executable by one or more processors for reducing adjacent channel leakage-power ratio (ACLR) at a transmitter, the code comprising:

code for mapping a modulated signal into a plurality of tone sets in a frequency domain, wherein the plurality of tone sets include a first, a second, and a third set of tones;

code for converting the first and the third set of tones in the frequency domain to a fourth and a fifth set of tones, respectively, in a time domain;

code for performing a zero padding of one or more symbols associated with the fourth and the fifth set of tones to output a sixth and a seventh set of tones, respectively;

code for converting the sixth and the seventh set of tones to an eighth and a ninth set of tones, respectively, in the frequency domain; and code for processing the eighth and the ninth set of tones for transmitting to another wireless device.

25. The non-transitory computer-readable medium of claim 24, wherein the first, the second, and the third set of tones are associated with head tones, center tones, and tail tones, respectively.

26. The non-transitory computer-readable medium of claim 24, wherein the code for converting the first and the third set of tones to the fourth and the fifth set of tones, respectively, comprises:

code for performing an inverse discrete Fourier transform (IDFT) on the first and the second set of tones, wherein the IDFT is of a first size.

27. The non-transitory computer-readable medium of claim 26, wherein the code for converting the sixth and the seventh set of tones to the eighth and the ninth set of tones, respectively, comprises:
  code for performing a discrete Fourier transform (DFT) on the sixth and the seventh set of tones, wherein the DFT is of a second size, and wherein the second size is greater than the first size.

28. The non-transitory computer-readable medium of claim 24, wherein the code for performing the zero padding of the symbols associated with the fourth set of tones to output the sixth set of tones further comprises:
  code for adding a first number of zeroes before the fourth set of tones and a second number of zeroes after the fourth set of tones.

29. The non-transitory computer-readable medium of claim 28, wherein the code for adding the first number of zeroes before the fourth set of tones comprises code for performing a cyclic prefix operation to add the second number of zeroes after the fourth set of tones as the first number of zeroes before the fourth set of tones.

30. The non-transitory computer-readable medium of claim 24, wherein the code for performing the zero padding of the symbols associated with the fifth set of tones to output the seventh set of tones further comprises:
  code for adding a first number of zeroes before the fifth set of tones and a second number of zeroes after the fifth set of tones.

* * * * *